(12) United States Patent
Filipovich

(10) Patent No.: US 6,619,738 B1
(45) Date of Patent: Sep. 16, 2003

(54) ARMREST ASSEMBLY WITH A STORAGE DEVICE

(75) Inventor: Michael M. Filipovich, West Bloomfield, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/590,813

(22) Filed: Jun. 9, 2000

(51) Int. Cl.[7] .................................................. A47C 7/62
(52) U.S. Cl. ............................. 297/188.16; 297/188.01
(58) Field of Search ..................... 297/188.01, 188.14, 297/188.16, 188.18, 188.19; 224/275, 483, 400; 383/6

(56) References Cited

U.S. PATENT DOCUMENTS

| | | | |
|---|---|---|---|
| 2,024,884 A | * | 12/1935 | Schlegel |
| 2,307,659 A | * | 1/1943 | Avery |
| 3,014,759 A | * | 12/1961 | Bing |
| RE26,299 E | * | 11/1967 | Burns |
| 3,572,562 A | * | 3/1971 | Floyd, Jr. |
| 4,756,459 A | * | 7/1988 | Hardman |
| 4,836,690 A | * | 6/1989 | Cheng |
| 4,852,780 A | * | 8/1989 | Woodbury |
| 5,044,321 A | * | 9/1991 | Selph |
| 5,495,969 A | * | 3/1996 | Cardenas |
| 5,562,331 A | * | 10/1996 | Spykerman et al. |
| 5,868,294 A | * | 2/1999 | Webster |
| 5,997,081 A | * | 12/1999 | Kayumi |
| 6,053,570 A | * | 4/2000 | Stern et al. |

FOREIGN PATENT DOCUMENTS

| | | | |
|---|---|---|---|
| DE | 2017 937 | 10/1971 | ........... B60R/11/00 |
| DE | 1755 686 | 12/1971 | ........... B60R/11/00 |
| DE | 296 05 952 U 1 | 7/1996 | ........... B60N/3/08 |
| JP | 11-301356 | 11/1999 | ........... B60R/7/04 |
| WO | WO 00/10836 | 3/2000 | ........... B60R/7/00 |

OTHER PUBLICATIONS

European Search Report on European Patent Application No. EP 01 11 1709, EPO Form 1503 03.82 (P04C01), Sep. 6, 2001 (1 sheet).

Annex to the European Search Report on European Patent Applications No. EP 01 11 1709, EPO Form P0459, Sep. 6, 2001 (1 sheet).

* cited by examiner

Primary Examiner—Milton Nelson, Jr.
(74) Attorney, Agent, or Firm—Foley & Lardner

(57) ABSTRACT

A storage device for a vehicle interior including a first portion connectable to a first vehicle component of the vehicle interior, a second portion releasably connected to a second vehicle component of the vehicle interior, and a middle portion located the first portion and the second portion. When the first portion is connected to the first vehicle component and the second portion is connected to the second vehicle component, the middle portion assumes a first form capable of storing objects.

17 Claims, 4 Drawing Sheets

ARMREST ASSEMBLY WITH A STORAGE DEVICE

TECHNICAL FIELD OF THE INVENTION

This invention generally relates to armrest assemblies. More specifically, this invention relates to armrest assemblies with a storage device connectable to a vehicle component and capable of storing objects.

BACKGROUND

For several decades, flexible pockets have been attached to the first surface of seat assemblies to store objects, such as magazines and maps. An evolution of the flexible pocket includes the use of a net weaving, which allows the flexible pockets to store other objects, such as portable phones, toys, or recyclable objects. The use of a net weaving, however, is less desirable in luxury vehicles. For this reason, a need exists for a storage device that deploys into a use position and retracts into a concealed position.

SUMMARY OF THE INVENTION

Accordingly, this invention provides for a storage device that overcomes the problems and disadvantages of the traditional techniques in the art. The invention also provides for a storage device that is releasably connectable between a first vehicle component and a second vehicle component of a vehicle interior.

Briefly, the invention includes a storage device for a vehicle interior including a first portion connectable to a first vehicle component of the vehicle interior, a second portion releasably connected to a second vehicle component of the vehicle interior, and a middle portion located between the first portion and the second portion. When the first portion is connected to the first vehicle component and the second portion is connected to the second vehicle component, the middle portion assumes a first form capable of storing objects.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
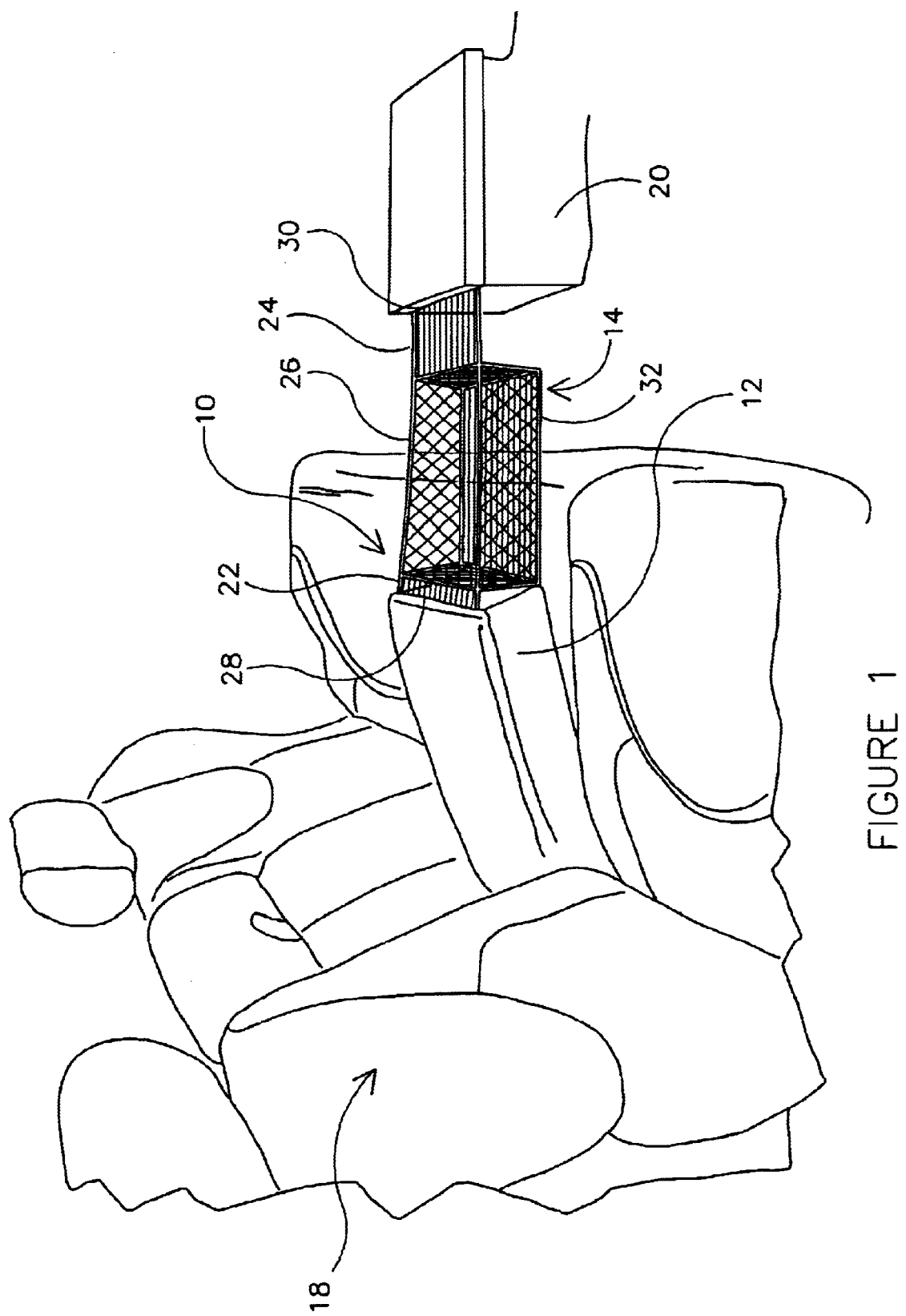
FIG. 1 is a perspective view of the armrest assembly of the preferred embodiment of the invention, with the storage device of the preferred embodiment of the invention in the first form.

As shown in FIG. 1, the armrest assembly 10 of the preferred embodiment of the invention includes an armrest body 12 and a storage device 14. The armrest assembly 10 is preferably located within a vehicle interior 16 and is preferably used to store objects, such as portable phones, toys, or recyclable objects. The armrest assembly 10, of course, may alternatively be located within other spaces and may alternatively be used for other purposes. In the preferred embodiment, the armrest body 12 (also referenced as a "first vehicle component") is mounted to a seat assembly 18, while the storage device 14 is releasably connected to a center console 20 (also referenced as a "second vehicle component"). In other embodiments, the armrest body 12 may be mounted to other suitable devices, such as a door panel or a vehicle floor.

The storage device 14 of the preferred embodiment of the invention includes a first portion 22, a second portion 24, and a middle portion 26. The first portion 22, which functions to anchor the storage device 14, is preferably connected with a first connector 28 to the armrest body 12, but may alternatively be connected to other suitable devices, such as a seat back, a seat cushion, or a door panel. The second portion 24, which functions to anchor the storage device 14, is preferably releasably connectable with a second connector 30 to the center console 20, but may alternatively be releasably connectable to other suitable devices, such as a seat back, a seat cushion, or a door panel. The first connector 28 and the second connector 30 function to allow specific placement of the middle portion 26 relative to the armrest body 12 and the center console 20 when the second portion 24 is releasably connected to the center console 20. The first connector 28 and second connector 30 preferably include releasable interlocking fasteners, such as metal snaps, but may alternatively include other suitable devices. Further, either the first connector 28 or the second connector 30 may include non-releasable fasteners, such as the so-called "living hinge".

When the second portion 24 of the console device is connected to the center console 20, the middle portion 26 preferably assumes a first form 32, which is preferably capable of storing objects, such as portable phones, toys, or recyclable objects. The first portion 22, the second portion 24, and the middle portion 26 are preferably made with conventional methods and from a stretchable yet durable material, such as nylon and spandex, which functions to increase the tautness of the storage device 14 when the second portion 24 is releasably connected to the center console 20. The first portion 22, the second portion 24, and the middle portion 26 may alternatively be made from other suitable materials, such as cotton or polyester, and with other suitable methods. Further, the first portion 22, the second portion 24, and the middle portion 26 are preferably made from the same material, and with the same methods, but may alternatively be made from different materials and with different methods.

Figure 2:
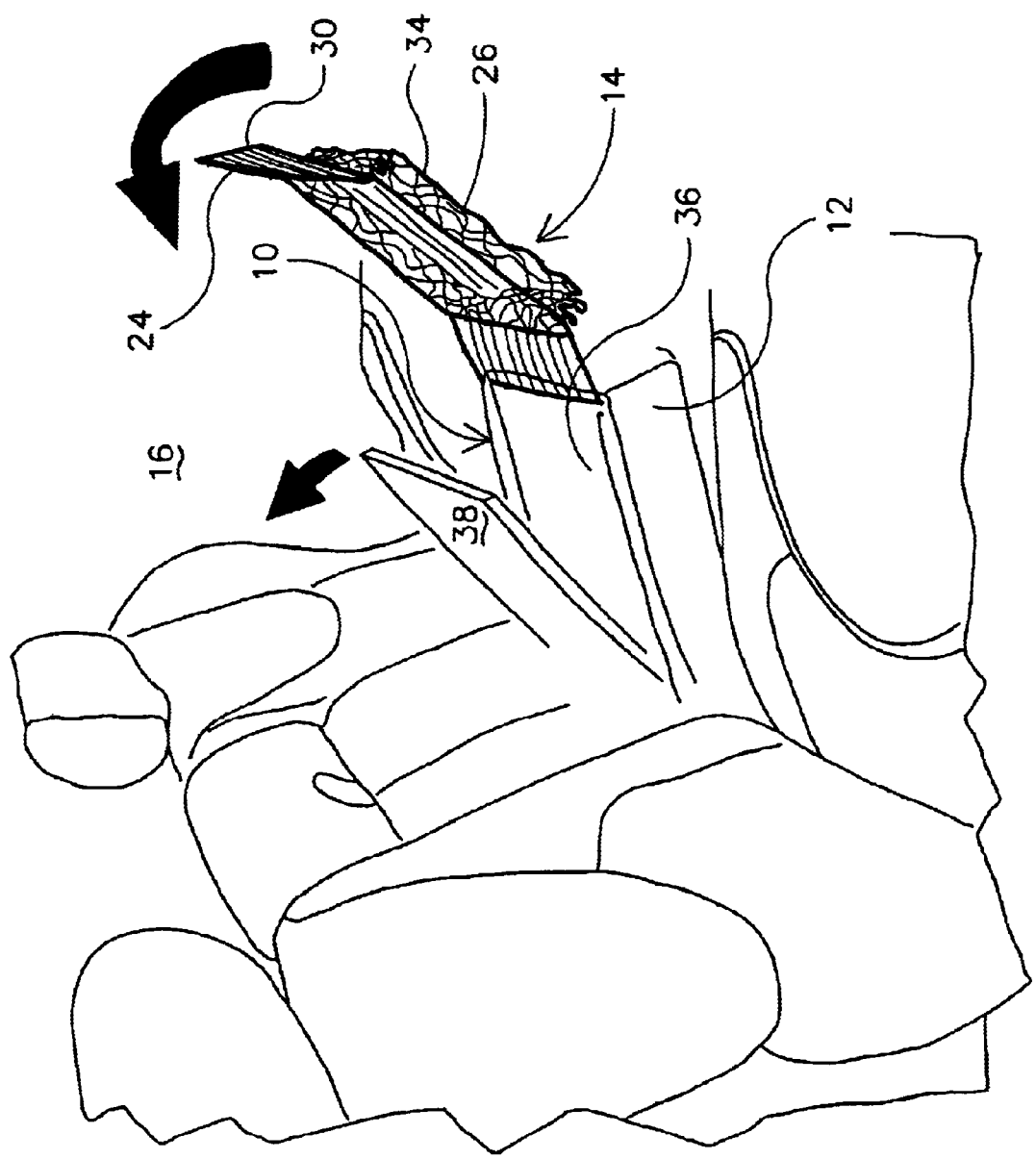
FIG. 2 is a perspective view of the armrest assembly of FIG. 1, with the storage device of FIG. 1 in the second form.
Figure 3:
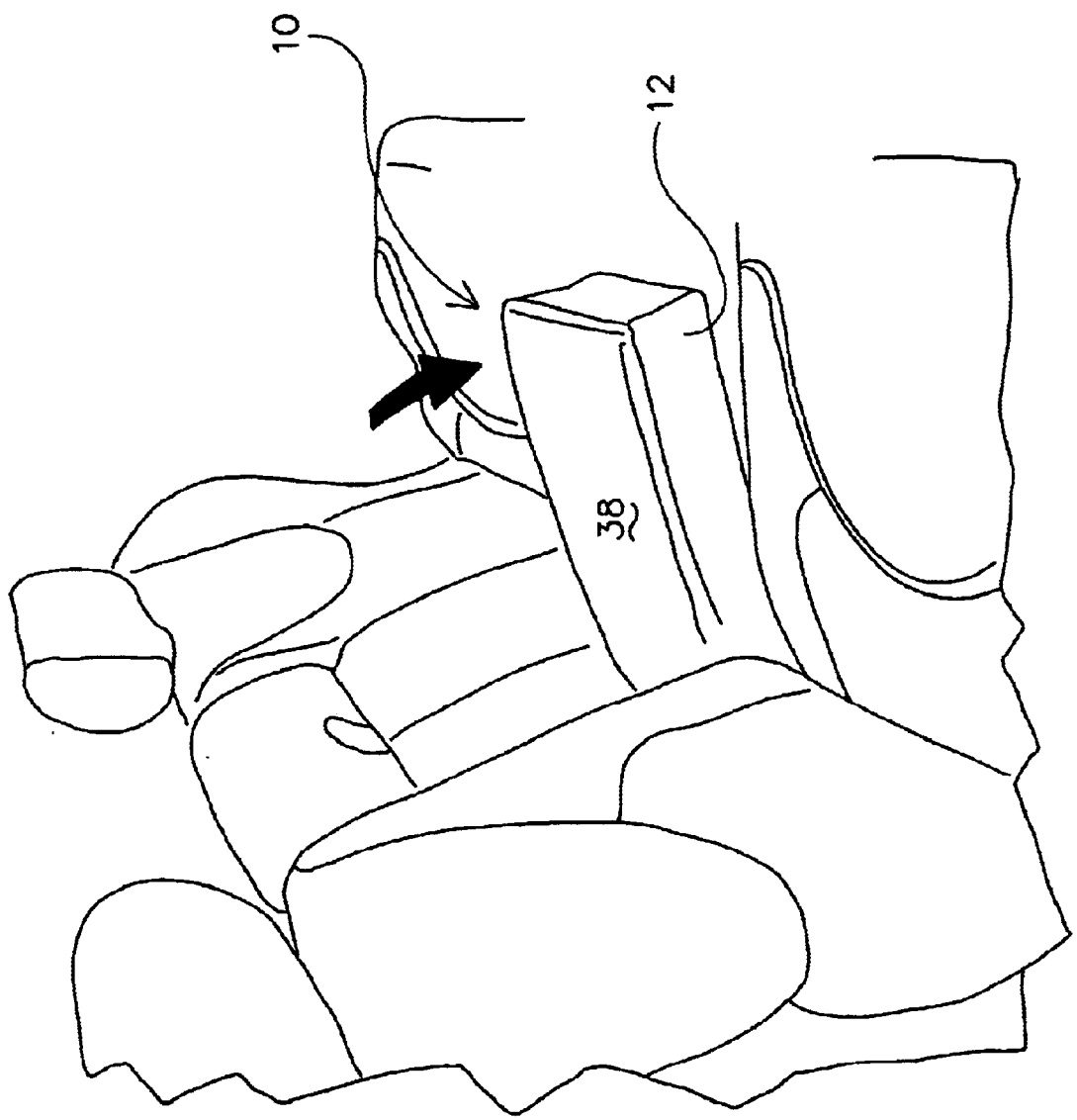
FIG. 3 is a perspective view of the armrest assembly of FIG. 1, with the storage device concealed within the armrest cavity of the armrest body.

As shown in FIG. 2, the middle portion 26 of the storage device 14 is preferably collapsible into a second form 34. This feature of the storage device 14, coupled with the second connector 30 of the second portion 24, allows the storage device 14 to be moved into an alternative location within the vehicle interior 16. To best use this feature of the storage device 14, the armrest body 12 preferably defines an armrest cavity 36 capable of storing the middle portion 26 in the second form 34. Further, the armrest assembly 10 preferably includes an armrest cover 38 fastened to the armrest body 12 for movement between an open position and a closed position (shown in FIG. 3) over the armrest cavity 36 of the armrest body 12. The storage device 14, the armrest cavity 36, and the armrest cover 38 are preferably designed such that when the middle portion 26 of the storage device 14 is collapsed into the second form 34 and placed within the armrest cavity 36 and when the armrest cover 38 is moved into the closed position over the armrest cavity 36, the armrest cover 38 and the armrest body 12 function as a typical armrest and completely conceal the storage device 14. The armrest body 12 is preferably made from conventional materials, such as a plastic or light-weight metallic material, and with conventional methods, but may alternatively be made from other suitable materials and with other suitable methods. The armrest cover 38 is preferably made from a flexible material, such as a rubber and cloth material, and with conventional methods, but may alternatively be made from other suitable materials and with other suitable methods.

Figure 4:
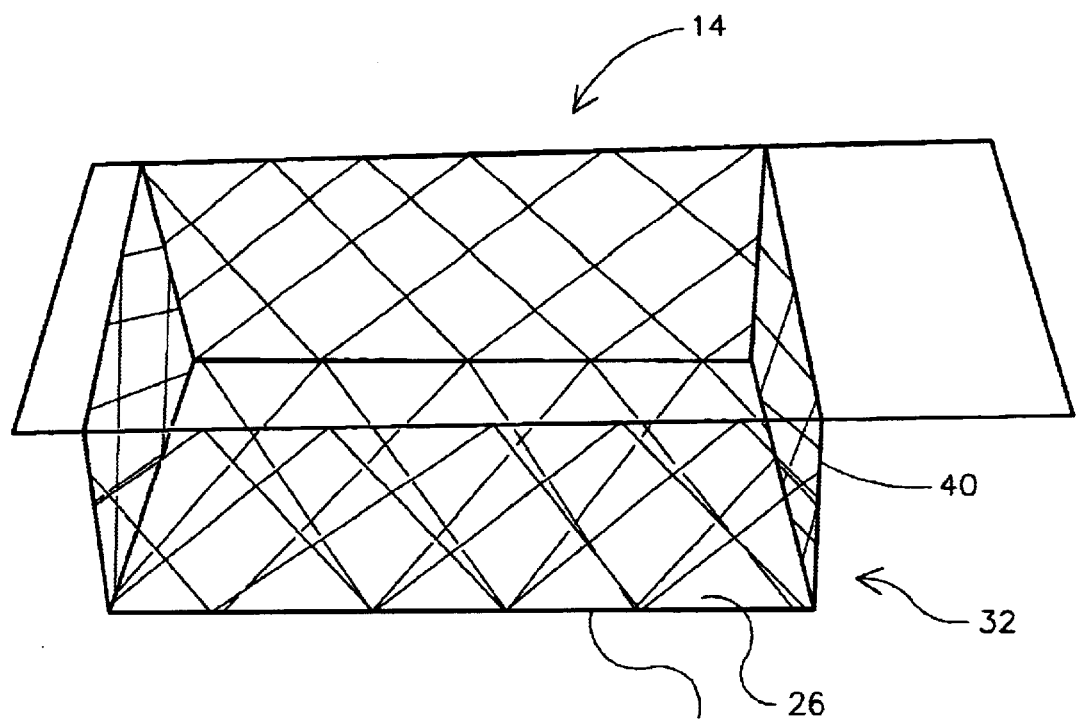
FIG. 4 is a perspective view of the storage device of the preferred embodiment of the invention.
Figure 5:
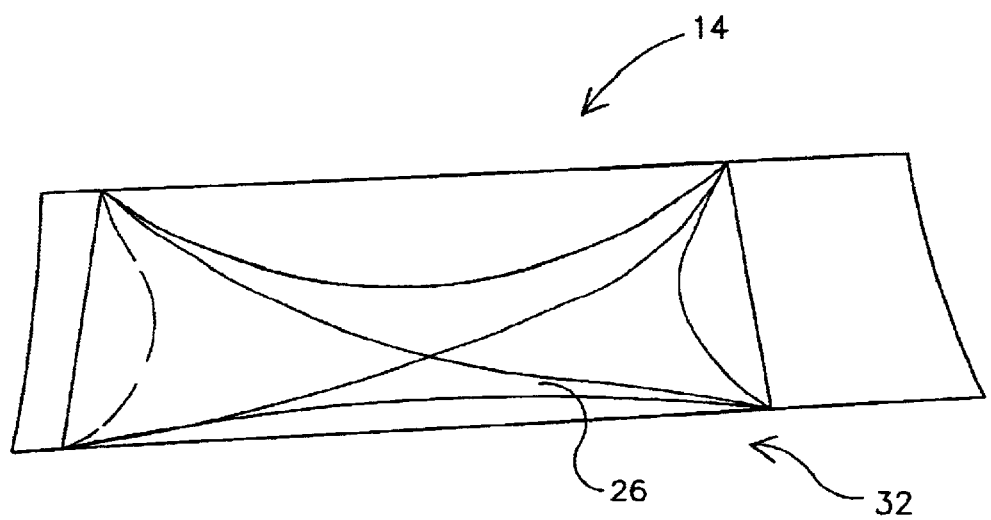
FIG. 5 is a perspective view of the storage device of an alternative embodiment of the invention.

As shown in FIG. 4, the middle portion 26 of the storage section preferably includes a side panel 40 projecting from the storage device 14, and a main panel 42 connected to the side panel 40 to assume the first form 32. In this manner, the first form 32 of the middle portion 26 preferably appears as a rectangular box. The first form 32 of the middle portion 26, however, may alternatively appear as a cylindrical container, a truncated pyramid or cone, or any other suitable shape. Further, the middle portion 26 of the storage device 14 may alternatively omit the side panel, as shown in FIG. 5. In this alternative embodiment, the main panel 42 is preferably capable of flexing under the weight of objects to thereby assume the first form 32. In other words, while the unburdened main panel 42 appears relatively flat, the burdened main panel 42 appears relatively concave. The middle portion 26 of the storage device 14 is preferably made with a net weave or pattern, which allows the middle portion 26 to easily assume both the first form 32 (shown in FIG. 4) and the second form 34 (shown in FIG. 2). The middle portion 26 may alternatively be made with other suitable weaves or patterns.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. An armrest assembly for a vehicle interior, comprising:
    an armrest body mountable to a seat assembly of the vehicle interior, the armrest body having an armrest cavity defined therein;
    a selectively deployable storage device having a first portion connected to said armrest body and configured for storage within said armrest cavity when said storage device is in a concealed position;
    said storage device having a second portion releasably connectable to a console of the vehicle interior when said storage device is deployed in a use position, and a middle portion located between said first portion and said second portion;
    such that when said second portion is connected to the console, said middle portion assumes a substantially rectangular form capable of storing objects and further comprises a stretchable material configured to resiliently maintain a taut condition.

2. The armrest assembly of claim 1 wherein said middle portion is collapsible.

3. The armrest assembly of claim 1 wherein at least one of said first portion and said second portion includes a stretchable section.

4. The armrest assembly of claim 1 further comprising an armrest cover fastened to an armrest body for movement between an open position and a closed position over said armrest cavity of said armrest body.

5. The armrest assembly of claim 1 wherein said middle portion includes a side panel projecting from said storage device, and a main panel connected to said side panel to assume the substantially rectangular form.

6. The armrest assembly of claim 1 wherein said middle portion includes a main panel capable of flexing under the weight of the objects to assume the substantially rectangular form.

7. The armrest assembly of claim 1 wherein said middle portion includes a stretchable section.

8. The armrest assembly of claim 1 wherein said first portion includes a first connector operable to locate said middle portion at a predetermined distance from said armrest body.

9. The armrest assembly of claim 1 wherein said second portion includes a second connector operable to locate said middle portion at a predetermined distance from the console.

10. A selectively deployable storage device for a vehicle interior, comprising:
    a first portion connectable to an armrest of the vehicle interior, said armrest having a cavity configured to receive said storage device in a concealed position;
    a second portion releasably connectable to a console of the vehicle interior when said storage device is deployed from said cavity to a use position; and
    a middle portion located between said first portion and said second portion;
    such that when said first portion is connected to the armrest and said second portion is connected to the console, said middle portion assumes a substantially rectangular form capable of storing objects and further comprises a stretchable material configured to resiliently maintain a taut condition.

11. The storage device of claim 10 wherein at least one of said first portion and said second portion includes a stretchable section.

12. The storage device of claim 10 wherein said middle portion is collapsible.

13. The storage device of claim 10 wherein said second portion includes a second connector operable to locate said middle portion at a predetermined distance from the console.

14. The storage device of claim 10 wherein said middle portion includes a side panel projecting from said storage device, and a main panel connected to said side panel to assume the substantially rectangular form.

15. The storage device of claim 10 wherein said middle portion includes a main panel capable of flexing under the weight of the objects to assume the substantially rectangular form.

16. The storage device of claim 10 wherein said middle section includes a stretchable section.

17. The storage device of claim 10 wherein said first portion includes a first connector operable to locate said middle portion at a predetermined distance from the armrest.

* * * * *